United States Patent [19]
McGinnis

[11] 3,794,043
[45] Feb. 26, 1974

[54] ENDOTRACHEAL TUBE WITH INFLATABLE CUFF AND CHECK VALVE

[75] Inventor: Gerald E. McGinnis, Monroeville, Pa.

[73] Assignee: Lanz Medical Products Company, Monroeville, Pa.

[22] Filed: Nov. 8, 1972

[21] Appl. No.: 304,604

[52] U.S. Cl. .......... 128/349 BV, 128/351, 137/525, 137/613, 251/149, 251/320, 251/339
[51] Int. Cl. .................. A61m 16/00, A61m 25/02
[58] Field of Search.......... 128/349 B, 349 BV, 351

[56] References Cited
UNITED STATES PATENTS
| 3,543,758 | 12/1970 | McWhorter | 128/349 B |
| 3,642,005 | 2/1972 | McGinnis | 128/351 |
| 3,726,282 | 4/1973 | Patel | 128/349 BV |
| 3,731,691 | 5/1973 | Chen | 128/351 |

FOREIGN PATENTS OR APPLICATIONS
733,890   7/1955   Great Britain............... 128/349 BV Primary Examiner—Channing L. Pace
Attorney, Agent, or Firm—Brown, Murray, Flick & Peckham

[57] ABSTRACT

One end of an endotracheal tube is encircled by an inflatable cuff, to which is connected a tubule that extends toward the opposite end of the tube and into a valve housing having an air inlet bore from which passages extend to the tubule and to an inflatable member. The bore contains valve means normally closing the adjacent ends of said passages, and means for opening the valve to admit air under pressure to those passages or release it therefrom. The valve housing also has a bypass connecting the two passages and closed by a check valve preventing escape of air from the cuff to the inflatable member in case the outside of the cuff is subjected to sudden pressure.

7 Claims, 3 Drawing Figures

PATENTED FEB 26 1974  3,794,043 ns and the body of the housing are provided with an
ENDOTRACHEAL TUBE WITH INFLATABLE CUFF AND CHECK VALVE In my U.S. Pat. No. 3,642,005, an endotracheal tube with an inflatable cuff and a pressure regulating balloon is shown. Air is forced into the cuff, such as by a syringe detachably connected to the outer end of a tubule leading into the cuff, in order to expand the cuff against the wall of the trachea to prevent leakage between them when a respirator connected to the endotracheal tube forces air into the lungs. The outer end portion of the tubule opens into a ballon that is expanded along with the cuff. The balloon is of such a character that it will expand to a size at which the air pressure in it is the same as the maximum air pressure desired in the cuff, after which the balloon will expand further without increasing that maximum pressure as additional air is forced into it. This prevents the cuff from being overinflated and injuring the patient.

The instrument shown in my patent serves its purpose very well in most cases, but occasionally it happens that the respirator connected to the endotracheal tube may deliver air to the patient at such a high pressure that it will compress the cuff by forcing air back into the balloon, thereby breaking the seal between the cuff and the trachea wall so that the air delivered by the respirator can escape past the cuff. Accordingly, it is an object of this invention to prevent such leakage from occurring. Another object is to provide an instrument of the character just described, in which air from the balloon can always flow freely into the cuff but in the reverse direction only at a very slow rate.

The preferred embodiment of the invention is illustrated in the accompanying drawings, in which FIG. 1 is a side view, with part of the cuff broken away in section;

Figure 1:
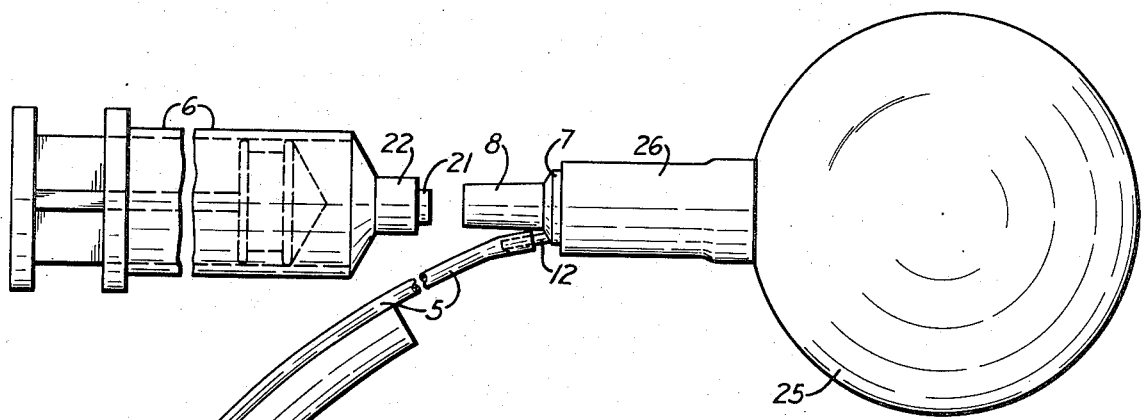
Figure 3:
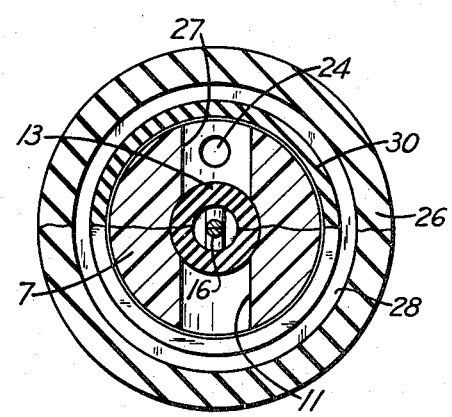
FIG. 3 is an enlarged cross section of the valve taken on the line III—III of FIG. 2.

Referring to FIG. 1 of the drawings, a flexible breathing tube 1, that is adapted to be inserted in a trachea 2 has an outer or proximal end for connection to breathing apparatus, such as a respirator (not shown) that will periodically force air into the lungs through the tube. The tube is encircled near its inner or distal end by a flexible cuff 3 that is attached to the tube and forms an air chamber around it. The cuff normally is more or less collapsed against the tube so that it and the tube can be inserted in the trachea. The surgeon selects a tube diameter based on his estimate of the diameter of the trachea. In order to inflate the cuff so as to form a seal with the wall of the trachea, a much smaller tube or tubule 5 is connected with the inside of the cuff and extends out along the larger tube, to which it may be attached.

Figure 2:
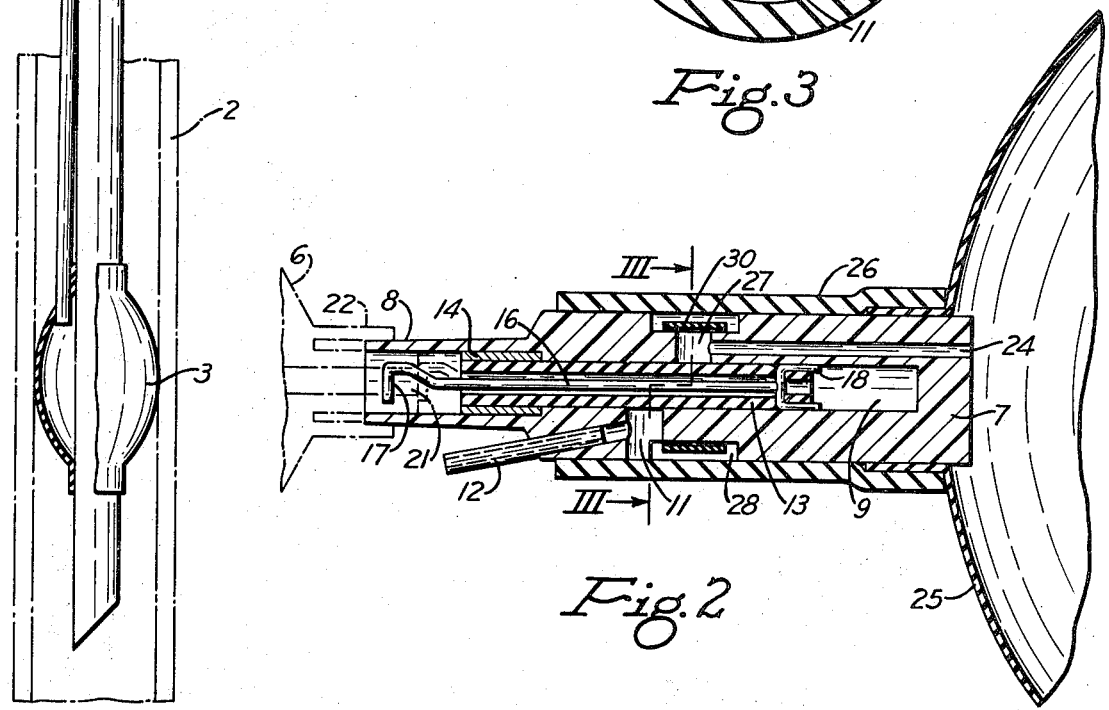
FIG. 2 is an enlarged longitudinal section of the new valve.

It is a feature of this invention that the proximal end of the tubule is connected to a valve, to which air under pressure can be supplied by any suitable device, but preferably by a conventional syringe 6 found in every hospital. The syringe forces air through the valve and the tubule and into the cuff to inflate it, and the valve is provided with means for closing it when the syringe is removed, whereby to prevent escape of air from the cuff. The valve housing may be a small cylindrical member or body 7 made of plastic and having a neck 8 projecting from one end. As shown in FIG. 2, this neck and the body of the housing are provided with an axial bore 9 extending from the outer end of the neck to a point near the opposite end of the housing. The housing also is provided with a passage 11 extending from the side of the bore radially outward and then lengthwise of the housing toward its neck. Projecting from this passage is a tiny tube 12 that is inserted in the outer end of tubule 5.

The inner end of valve passage 11 normaly is closed by a movable valve member so that air that has been forced into the central bore and through the passage to the tubule cannot escape from the housing inlet. Preferably, the valve member is formed from a short length of resilient tubing 13, such as rubber tubing, or from a short molded tubule. This short tube is inserted in the housing bore 9 and extends across the opening into passage 11. The opposite ends of the tube are spaced inwardly from the adjacent ends of the bore, and the outer end portion of the tube is tightly encircled by a metal sleeve 14 that fits in the bore and engages a shoulder in it. The normal diameter of the rubber tube is slightly greater than the restricted portion of the bore so that the tube normally presses outwardly against the wall of the bore and thereby closes passage 11.

In order to open the valve so that air can flow between its inlet and passage 11 in either direction, a stiff pin 16 extends loolsely through the inside of valve tube 13. The outer end of this pin is bent or otherwise deformed to form a head 17 spaced outwardly from the outer end of the valve tube but still inside of the housing bore. The inner end of the pin is provided with an integral fork 18 that extends through openings in opposite sides of the inner end of tube 13, so that when the head of the pin is pushed toward that tube its forked end will stretch the tube toward the inner end of the bore, due to the outer end of the tube being restrained by sleeve 14 and the shoulder it engages, whereby a reduction in the diameter of the tube will take place. This will create a small space around the tube between it and the encircling wall of the bore so that air can pass through the tube around the pin therein, out of the inner end of the tube and then back around the outside of the tube and into passage 11 leading to tubule 5. Or, if it is desired to deflate the cuff, air can flow from the cuff in the reverse direction through the same path.

The inner and outer diameters of the valve housing neck 8 are such that the nozzle 21 of the syringe can be inserted in the end of the neck, with the usual collar 22 that encircles the nozzle encircling the neck as indicated in dotted lines in FIG. 2. As the nozzle is pushed into the housing neck, the nozzle engages the head of the pin and pushes it toward the valve tube to open the valve in the manner just described. When the syringe is removed from the valve housing, the resiliency of the tube causes it to return to its normal shorter length and larger diameter, which closes the valve.

The valve housing also is provided with a second passage 24, but this one extends from the side of axial bore 9 to the end of the housing opposite its neck. This end of the housing is encircled by an inflatable member that may simply indicate whether or not there is air pressure in the cuff. Preferably, however, the inflatable member is a balloon 25 having the characteristics of the one disclosed in my above-mentioned patent. Such a balloon prevents overinflation of the cuff because the balloon material decreases in thickness as it is stretched by air forced into it until it has expanded to a size at which the air pressure in it is the same as the maximum air pressure desired in the cuff. Thereafter, as additional air is forced into the balloon it continues to stretch without increasing the pressure. The neck of the balloon is held in place on the valve housing by an elastic band 26 that encircles the housing and balloon neck and seals them together.

Passage 24 normally is closed by valve tube 13, but it will be seen that while the valve is open and air is being forced into the cuff, air will flow simultaneously through the second passage 24 and into the balloon to inflate it. Since it is necessary for the proper operation of this instrument that the balloon be in communication with the cuff while both are inflated and the valve is closed, so that the pressure in the balloon can maintain proper pressure in the cuff, the valve housing is provided with a bypass connecting the two passages 11 and 24. This bypass may be formed by a radial port 27 that connects passage 24 with the base of a circumferential groove 28 extending around the valve housing. The outer side of this groove is sealed by the encircling elastic band 26. The passage 11 to the cuff opens into the side of the groove. Consequently, even though the valve is closed, compressed air in the balloon remains in communication with the air in the cuff, via passage 24 and the bypass and passage 11, to keep the cuff inflated the desired amount in case air tends to leak from it. The operation of this instrument is the same in this respect as the one shown in my patent.

It will be seen from the description thus far that if the air pressure created periodically in the trachea at the distal or lower end of the cuff by means of a respirator exceeds the pressure in the cuff the latter could be compressed, because air could be forced from it out through the tubule and into the balloon. Compression of the cuff would permit leakage around it. To prevent this, the bypass in the valve housing is provided with a check valve in accordance with this invention. With the arrangement shown, the check valve is formed from a flexible band 30 that encircles the valve housing in the base of groove 28 and therefore covers the outer end of the bypass port 27. If a pressure drop starts to occur between the balloon and the cuff, the greater air pressure in the balloon can hold the check valve away from the bypass port far enough to permit air to flow freely into the bypass groove and then out through passage 11 to the cuff. On the other hand, if there is a sudden excessive increase in air pressure at the distal end of the cuff, as may occur every time the respirator forces a charge of air into the lungs, the suddenly increased pressure of the air in the cuff and tubule will be exerted against the outside of the check valve band and thereby force it tightly against the outer end of the bypass port so that the air cannot enter passage 24 and flow into the balloon. This prevents the seal between the cuff and the wall of the trachea from being impaired.

A further feature of this invention is that the check valve band 30 normally does not seat firmly on the base of the bypass groove, but engages it rather loosely. This permits air in the cuff to leak slowly past the check valve and into passage 24 leading to the balloon during exhalation, in case the pressure inside the cuff has become excessive for reasons other than increased air pressure around its distal end. This provision for leakage is desirable because there are times when the pressure of the cuff against the wall of the trachea might otherwise be increased for a long time. This could happen, for example, if the endotracheal tube and cuff were moved accidentally further down in a downwardly tapered trachea from their original position. In such a case it would be desirable to allow some of the air to escape from the cuff so that it would not press too tightly against the trachea wall. With the leaking check valve disclosed herein, this excess air could escape into the balloon and again equalize the pressure between them.

If desired, the neck of the balloon can be extended and used as the check valve, in which case the band 26 would be a rigid sleeve spaced from the check valve portion of the neck.

With the instrument disclosed herein, it is immaterial whether the pressure of the air forced into the lungs by a respirator is less than the pressure inside the cuff, or more. In either case the seal between the cuff and trachea wall will remain intact.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with an endotracheal tube with distal and proximal ends, and a normally collapsed flexible cuff encircling the tube near its distal end and having opposite ends attached to the tube, of a tubule extending from the cuff outwardly along said tube and having a distal end communicating with the inside of the cuff, the proximal end of the tubule having an inlet for air under pressure for inflating the cuff, an inflatable member, a valve housing provided with an air inlet bore and passages extending from the side of the bore to the inflatable member and the proximal end of the tubule respectively, valve means in said bore normally closing the adjacent ends of said passages, means for opening said valve means to admit air under pressure through said inlet bore to said passages to inflate the cuff and said inflatable member, the valve housing also having a bypass connecting said passages, and a check valve in said bypass restricting flow of air from the cuff to said inflatable member, whereby sudden pressure against the outside of the cuff will not force air from it back into the inflatable member.

2. The combination recited in claim 1, in which said valve opening means is an actuating member in said inlet bore for opening the valve means when pushed, the outer end of said member being formed for engagement by the nozzle of a syringe inserted in said inlet bore to push said member inwardly and to inject air into said passages.

3. The combination recited in claim 1, in which said check valve normally is not fully closed, whereby air from the cuff can leak past it slowly if the pressure inside the cuff becomes greater than that in said inflatable member.

4. The combination recited in claim 1, in which said inflatable member is a balloon.

5. The combination recited in claim 4, said balloon being formed of material that decreases in thickness as it is stretched by air forced into it until it has expanded to a size at which the air pressure therein is the same as the maximum air pressure desired in the cuff, and the balloon having the property of then stretching further without increase in said maximum pressure as additional air is forced into it to expand it more.

6. The combination recited in claim 1, in which said valve means include a resilient tube disposed in said inlet bore and normally fitting tightly therein to close said passages, and means anchoring the outer end of the tube in said bore, said valve-opening means being a pin extending axially and loosely through said tube and having a projecting outer end provided with a head, the inner end of the pin being attached to the inner end of the tube so that when said head is pushed toward the tube the pin will stretch the tube lengthwise and cause it to contract radially, whereby air forced into the outer end of said bore can pass through the tube and then into said passages.

7. The combination recited in claim 1, in which said bypass includes a circumferential groove in said valve housing, a port connecting the groove with the passage that extends between said bore and inflatable member, and an opening between the groove and the other passage, and said check valve is a flexible band loosely encircling said housing in said groove and covering said port, said band tightly closing said port when subjected to said sudden pressure.

* * * * *